Nov. 10, 1970 S. C. REQUA ET AL 3,539,719

ELECTRON BEAM SCANNING DEVICE

Filed July 24, 1967 4 Sheets-Sheet 1

INVENTORS.
STANLEY C. REQUA
JERALD R. IZATT
BY
Sokolski & Wohlgemuth
ATTORNEYS

ELECTRON BEAM SCANNING DEVICE

INVENTORS.
STANLEY C. REQUA
JERALD R. IZATT
BY
Sokolski & Wohlgemuth
ATTORNEYS

| | | | | | | | |
|---|---|---|---|---|---|---|---|
| 2 | 3 | 4 | 3 | 4 | 5 | 4 | 3 |
| 1 | 2 | 3 | 2 | 3 | 4 | 3 | 2 |
| 0 | 1 | 2 | 1 | 2 | 3 | 2 | 1 |
| 1 | 2 | 3 | 2 | 3 | 4 | 3 | 2 |
| 2 | 3 | 4 | 3 | 4 | 5 | 4 | 3 |
| 1 | 2 | 3 | 2 | 3 | 4 | 3 | 2 |
| 2 | 3 | 4 | 3 | 4 | 5 | 4 | 3 |
| 3 | 4 | 5 | 4 | 5 | 6 | 5 | 4 |

| | | | | | | | |
|---|---|---|---|---|---|---|---|
| 2 | 4 | 4 | 4 | 4 | 6 | 4 | 4 |
| 2 | 2 | 4 | 2 | 4 | 4 | 4 | 2 |
| 0 | 2 | 2 | 2 | 2 | 4 | 2 | 2 |
| 2 | 2 | 4 | 2 | 4 | 4 | 4 | 2 |
| 2 | 4 | 4 | 4 | 4 | 6 | 4 | 4 |
| 2 | 2 | 4 | 2 | 4 | 4 | 4 | 2 |
| 2 | 4 | 4 | 4 | 4 | 6 | 4 | 4 |
| 4 | 4 | 6 | 4 | 6 | 6 | 6 | 4 |

| | | | | | | | |
|---|---|---|---|---|---|---|---|
| 2 | 4 | 4 | 4 | 4 | 6 | 4 | 4 |
| 2 | 4 | 4 | 4 | 4 | 6 | 4 | 4 |
| 0 | 2 | 2 | 2 | 2 | 4 | 2 | 2 |
| 2 | 4 | 4 | 4 | 4 | 6 | 4 | 4 |
| 2 | 4 | 4 | 4 | 4 | 6 | 4 | 4 |
| 2 | 4 | 4 | 4 | 4 | 6 | 4 | 4 |
| 2 | 4 | 4 | 4 | 4 | 6 | 4 | 4 |
| 4 | 6 | 6 | 6 | 6 | 8 | 6 | 6 |

INVENTORS.
STANLEY C. REQUA
JERALD R. IZATT
BY
Sokolski & Wohlgemuth
ATTORNEY

ELECTRON BEAM SCANNING DEVICE

Filed July 24, 1967

INVENTORS.
STANLEY C. REQUA
JERALD R. IZATT
BY
Sokolski & Wohlgemuth
ATTORNEY

United States Patent Office 3,539,719

Patented Nov. 10, 1970

3,539,719

ELECTRON BEAM SCANNING DEVICE

Stanley C. Requa, Northridge, Calif., and Jerald R. Izatt, Las Cruces, N. Mex., assignors to Northrop Corporation, Beverly Hills, Calif., a corporation of California Filed July 24, 1967, Ser. No. 655,606
Int. Cl. H04n *1/38*
U.S. Cl. 178—7.7 5 Claims

ABSTRACT OF THE DISCLOSURE

A plurality of flat coded dynode members are sandwiched between an electron emitting cathode in the form of a flat plate and a flat target plate. Each dynode has a plurality of apertures formed therein which are effectively aligned with corresponding apertures on all the other dynodes. The dynodes further each have a pair of separate conductive portions thereon forming fingers, such fingers being arranged in a predetermined coded configuration. A filter dynode is also placed between the cathode and the target plate to effectively eliminate "ghosts" in the display presented on the target. Digital control means are connected to the coded finger portions of the dynode members to control the application of electron accelerating potentials thereto in accordance with addressing logic, thus addressing the electron beam from the cathode to the target in accordance with an addressing control signal.

This invention relates to an electron beam scanning device and more particularly to such device suitable for display, memory or image sensor purposes which is operative in response to a digital control signal.

An electron beam scanning device is described in copending application Ser. No. 511,747, now Pat. No. 3,408,532, assigned to Northrop Corporation, assignee of the instant application, which has a relatively flat thin configuration and which is capable of high linearity and good definition. This device utilizes electron multiplication techniques, operates in response to a digital control signal and is capable of random addressing as well as linear scanning. This device utilizes a plurality of dynode members each of which has apertures therein which are alined with corresponding apertures on succeeding dynodes and which have conductive finger portions coded in a predetermined pattern. An electron beam is accelerated between the cathode and a target plate by applying accelerating potentials to these finger portions in accordance with predetermined digital addressing signals. In accomplishing such addressing, an electron beam is accelerated through a single group of alined apertures which form a channel through all the dynode members, while through all of the other alined apertures the beams are subjected to one or more retardation signals at one or more of the dynodes.

It has been found in the instances where only a single dynode is presenting a retardation signal to an electron beam, a certain number of electrons get through to the target causing a "false" or "ghost" signal to appear on the target. This ghost signal, while of lower intensity than the true signal, nevertheless does provide a confusing undesirable display. It is the primary object of this invention to eliminate this undesirable false display.

It is a further object of this invention to make for a more accurate display in an electron beam scanning device.

It is another object of this invention to provide relatively simple yet highly effective means for eliminating ghost signals in an electron beam scanning device.

It is still another object of this invention to improve the accuracy of the display of a digitally controlled scanning device of the type utilizing finger pattern coded control dynodes.

Figures 1, 2:
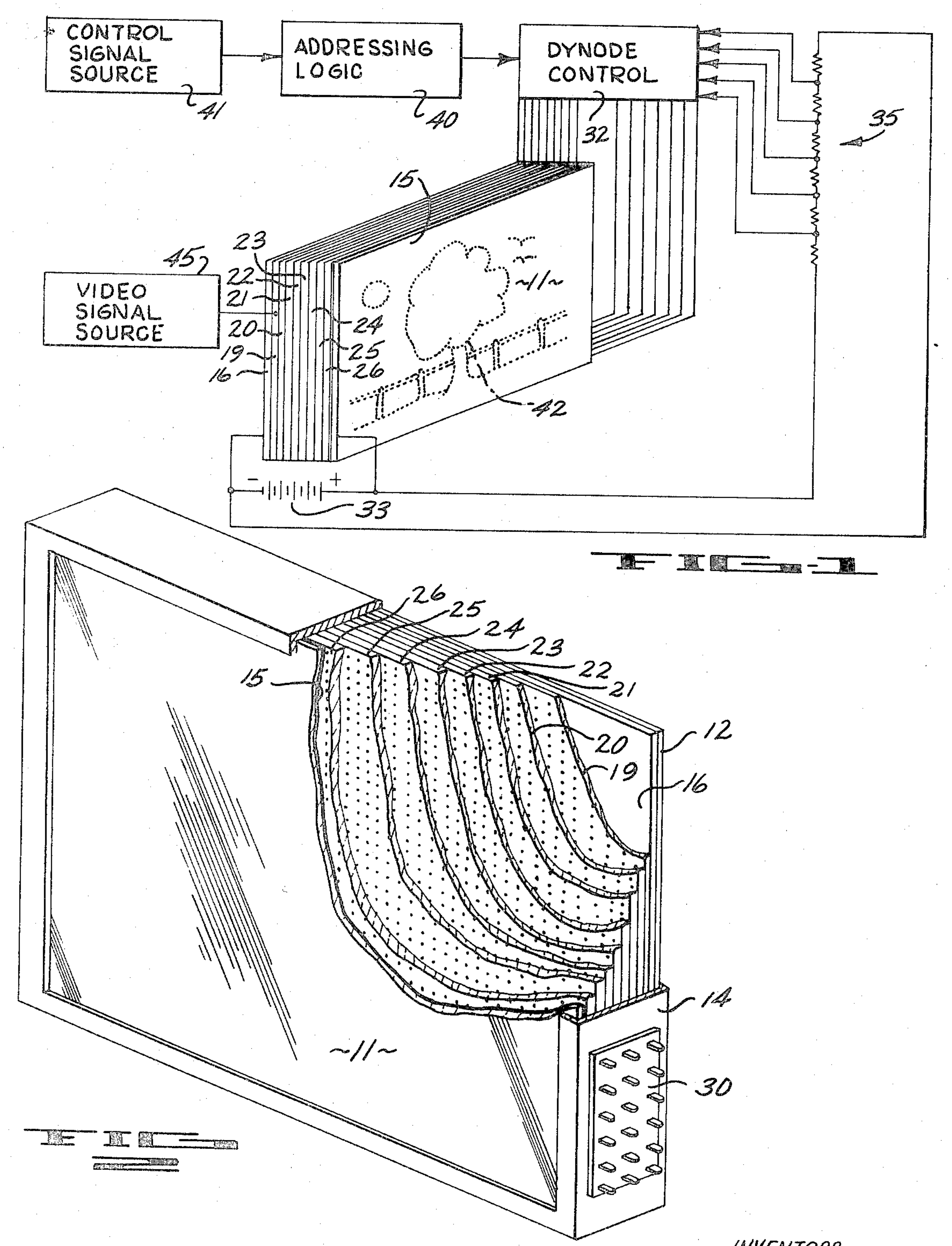
Figure 3:
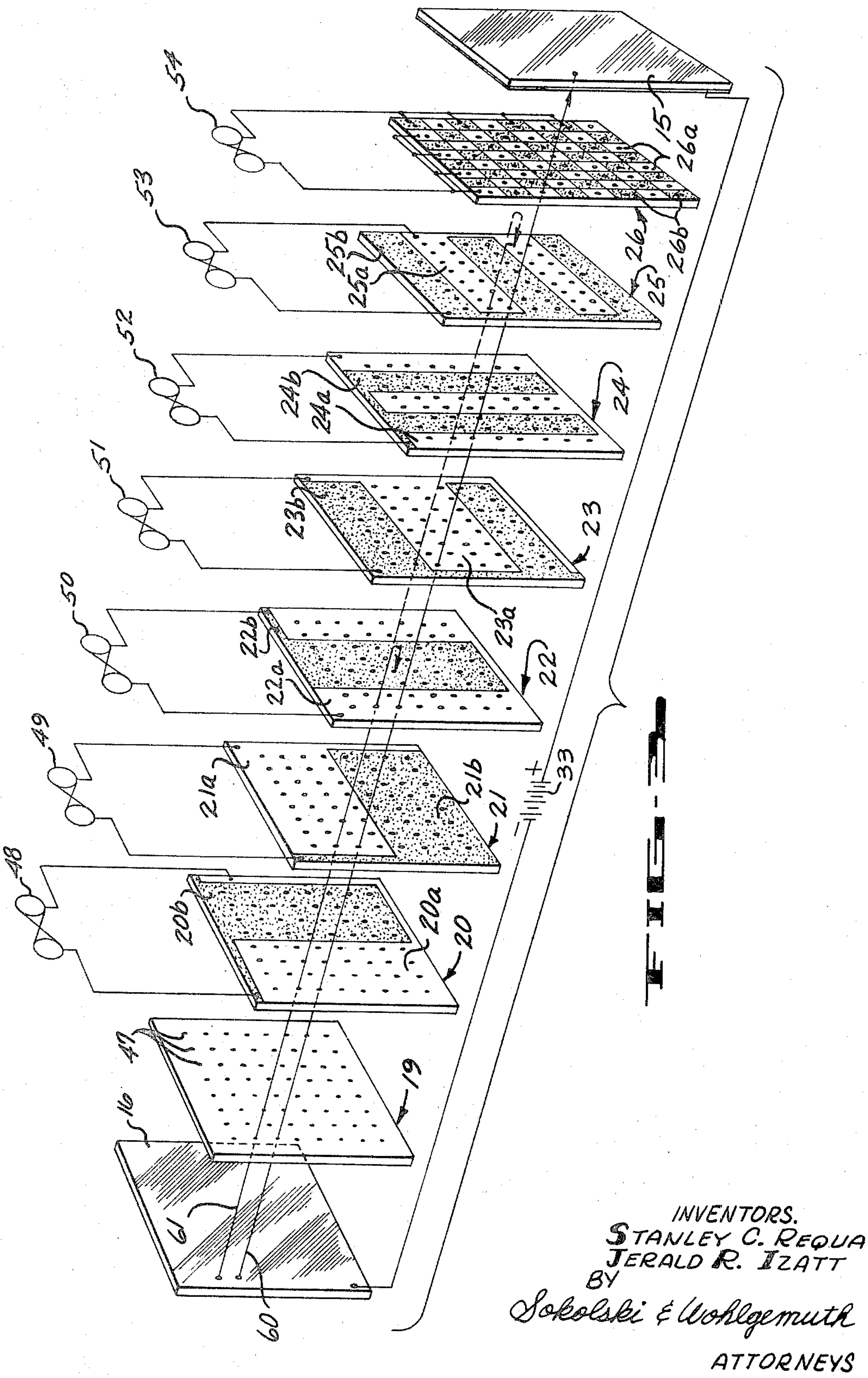
Figures 3A, 5A, 5B, 5C:
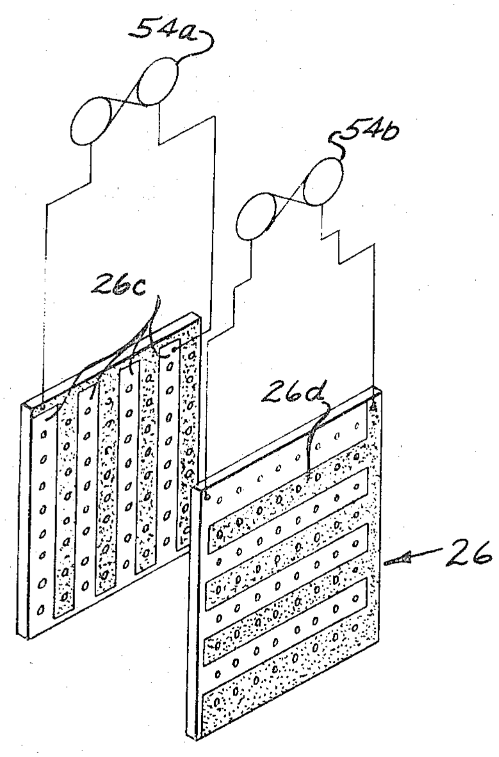
Figure 4:
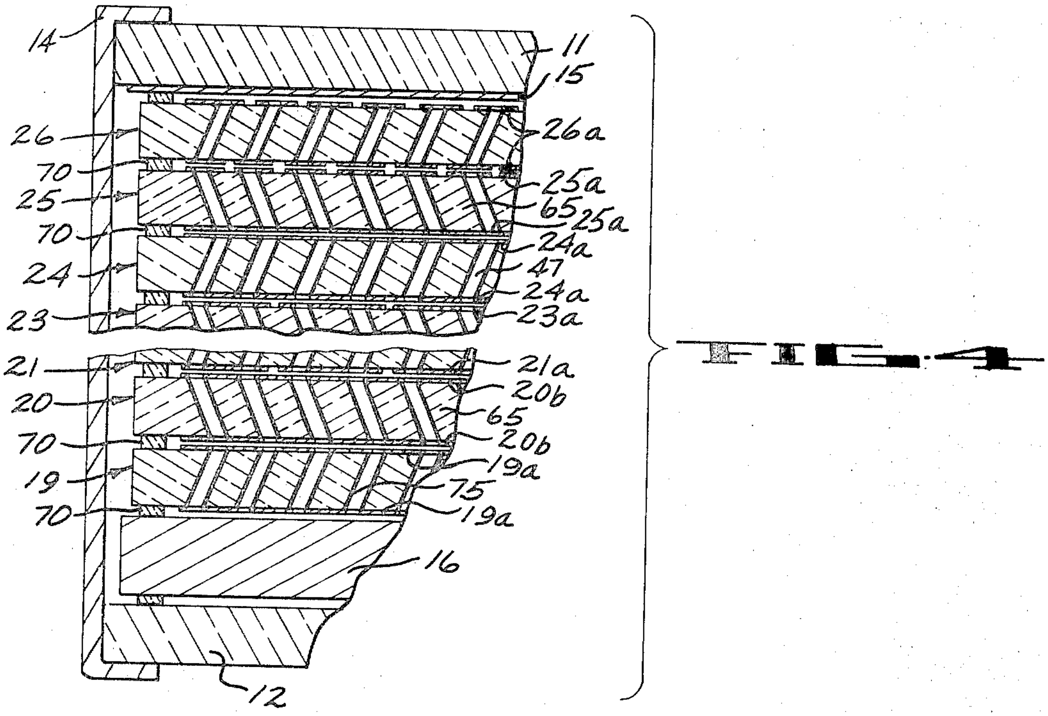
Figure 5:
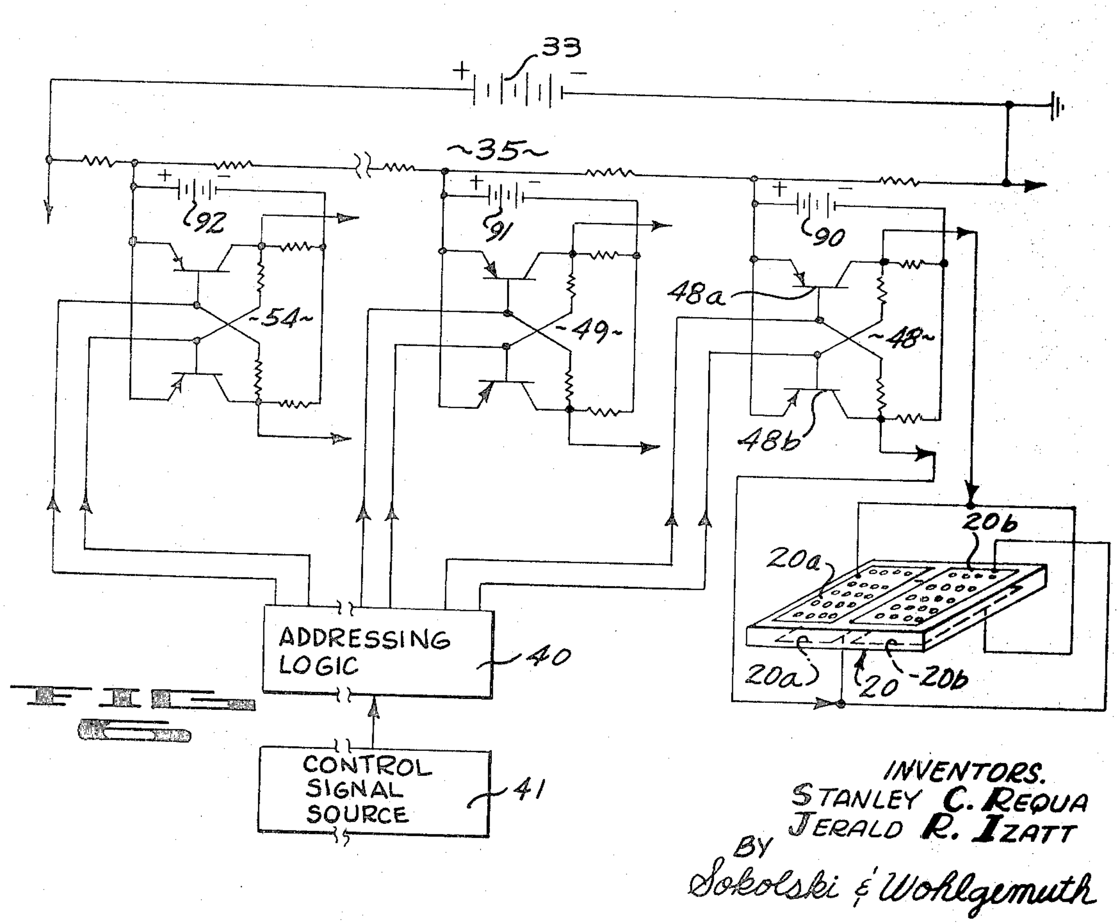

Other objects of this invention will become apparent from the following description taken in connection with the accompanying drawings, of which:

FIG. 1 is a schematic drawing illustrating the basic configuration of the device of the invention, FIG. 2 is a perspective view of one embodiment of the device of the invention, FIG. 3 is an exploded perspective view illustrating the operation of the control dynodes in one embodiment of the device of the invention, FIG. 3*a* is a perspective illustration of an alternate type of filter which may be utilized in the device of the invention, FIG. 4 is a cross sectional view illustrating details of structure of the embodiment of FIG. 2, FIGS. 5*a*–5*c* are a series of charts illustrating ghost signal elimination in the device of the invention, and FIG. 6 is a schematic drawing illustrating binary switching circuitry which may be utilized in the device of the invention.

Briefly, the device of the invention utilizes a plurality of coded dynode members which are sandwiched between an electron emitting cathode and a target plate. Each dynode has a plurality of apertures formed therein which are effectively aligned with corresponding apertures on all the other dynodes. The dynodes further each have conductive portions thereon which are arranged in predetermined coded finger configurations. Digital control means is connected to these finger portions in accordance with an addressing control signal to accelerate an electron beam through a selected series of aligned apertures which form an electron channel between the cathode and the target, the flow of electrons being retarded through all of the other so formed electron channels. The electron flows through the non-selected channels are further retarded to prevent "ghost" signals from appearing on the target by means of a special filter dynode which in one embodiment is in the form of a checkerboard pattern and in another embodiment is in the form of a pair of dynodes each having binary coded fingers which are arranged in perpendicular relationship to each other.

Referring now to FIG. 2, one embodiment of the device of the invention is illustrated. This particular embodiment, for illustrative purposes, is shown as a display device. It can be readily appreciated, however, that the same general construction can be utilized for an image sensor or a memory tube by appropriate modifications within the purview of those skilled in the art. A casing is formed by image plate 11, back plate 12, and frame 14 which are joined together in air tight relationship and the enclosed space evacuated to provide a vacuum environment. On the inner surface of image plate 11 is a phosphor coatig 15. Back plate 12 has an electron emissive cathode 16 mounted thereon. Cathode 16 is preferably of the cold cathode type nad may have a radioactive or photo emissive surface which is suitable for providing an adequate electron current.

Sandwiched between cathode 16 and plate 11 are a control grid member 19 and a plurality of dynode members 20–26. Each of these dynode members, as to be explained fully further on in the specification, includes a pair of oppositely positioned conductive sections which are formed on an insulating member. A plurality of electron beam directing apertures are formed in the dynode members. The various power and control signals are fed to the various dynodes, the grid and the cathode and phosphor target through electrical receptacle 30.

Referring now to FIG. 1, the general operation of the device of the invention is illustrated. An electron accelerating potential supplied by DC power source 33 is applied between phosphor target 15 and cathode 16. Various gradated potentials between the target potential and the cathode potential are supplied to dynode control 32 from voltage divider 35. As to be explained in detail in connection with FIG. 6, dynode control 32 supplies an electron beam accelerating potential to half of the conductive portions of each of dynodes 20–26, and an electron beam repelling potential to the other half of the conductive portions of each of the dynodes. Thus, at any one time, half of the control area of each dynode is repelling the electron beam while the other half of the control area of each dynode is accelerating the beam. The dynode accelerating and repelling conditions at any particular time are controlled in response to addressing logic 40 which actuates dynode control 32 in response to a control signal source 41. Thus, control signal source 41 may cause dynode control 32 to effect a scanning pattern on target 15 such that a video image 42 is generated in response to video signals fed to control grid 19 from a video signal source 45. It is to be noted that while a device for showing a conventional video display is shown in FIG. 1 for illustrative purposes, that dynode control 32 can also be made to operate in response to a random addressing input which will excite any portion of target 15 directly without passing through adjacent portions of the target, i.e., the beam can be shifted from one side of the screen to the other without passing through any of the intermediary points. This will become apparent as the description proceeds.

Referring now to FIG. 3, an exploded schematic drawing is shown illustrating the operation of one embodiment of the device of the invention. Positioned between electron emitting cathode 16 and target 15 is a control grid 19 and a plurality of dynode members 20–26. Grid 19 and each of dynode members 20–26 has a series of apertures 47 formed therein, each aperture on the control grid and each dynode being substantially aligned with an associated aperture on each of the other dynodes. Dynode 20 has a first electrically conductive portion **20*a* covering substantinally half of its broad surface area, and a second electrically conductive portion 20*b* covering substantially the other half of such broad surface area, such conductive portions being electrically insulated from each other and connected to opposite outputs of flip-flop 48. Thus, when conductive portion 20*a* is receiving one potential output of flip-flop 48, conductive portion 20*b* is receiving the other potential output thereof, and vice versa. Dynodes 21–26 have paired conductive portions 21*a*–26*a* and 21*b*–26*b*, which are insulated from each other similarly to sections 20*a* and 20*b* and operate in the same fashion in response to flip-flops 49–54** respectively.

Each of the dynode conductive portions covers substantially one half the broad surface area of its associated dynode but such portions are arranged in different finger patterns, such that by proper actuation of flip-flops 48–54 an electron beam can be made to pass from cathode 16 through to target 15 through only one selected set of aligned apertures 47 at any one time. Such operation is illustrated in FIG. 3 for a combination of flip-flop actuations whereby dynode sections **20*a*–26*a* have an electron beam accelerating potential thereon and whereby dynode portions 20*b*–26*b* (indicated by stippling) have an electron beam repelling potential thereon. For the example shown in FIG. 3, it can be seen that the beam represented by the line 60 is the only one that can pass all the way through to the target. All other beams, such as for example that indicated by the line 61, are prevented from passage by a repelling potential (in this instance provided by dynode portions 23*b* and 26*b*) somewhere along their respective paths. Thus, it can be seen that by various combined actuations of flip-flops 48–54** in response to gating control signals, various scanning patterns for either regular scanning or random addressing of the target can be achieved. As described in the aforementioned application Ser. No. 511,747, the beam current is amplified appreciably by electron multiplication techniques to assure sufficient beam current at the target.

Dynode 26 constitutes a special filter which is utilized to filter out "ghost" signals due to inadequate retardation provided by only a single dynode member, as for example in the case of the beam indicated by line 61. It is this particular filter element as utilized in conjunction with Gray type coding in the other dynodes which provides the improvement over the device of the aforementioned co-pending application.

As can be seen, beam 61 only receives a retarding potential from dynode portion **23*a*. With such a single retardation factor, a certain number of electrons will often pass through the retarding dynode portion 23*a* and will arrive at the target to cause a moderate intensity "ghost" signal. Such extraneous actuation of the target 15 is prevented by placing an additional retardation member in the electron beam path by means of filter dynode 26. As can be seen, in the case of beam 61 this additional retardation is achieved by placing a retardation potential on half of the apertured portions 26*b* of the filter dynode while remaining portions 26*a* have an accelerating potential thereon. Dynode filter 26 has a checkerboard pattern covering its entire surface, each checkerboard square covering a single electron aperture. Half of the squares 26*a* are connected to one of the flip-flop stages of flip-flop 54, while the other half of the checkerboard squares 26*b*, which are alternately interspersed between squares 26*a*, are connected to the other flip-flop stage of flip-flop 54. Checkerboard squares 26*a* or squares 26*b* are alternatively provided with an acceleration or retardation potential in accordance with an addressing signal provided to flip-flop 54.**

Referring now to FIG. 3*a*, a filer device which may be alternatively utilized in place of the checkerboard filter 26 is illustrated. This filter unit comprises a pair of dynode members, one of said dynode members having vertical finger patterns **26*c*, the other of these dynodes having horizontal finger patterns 26*d*. Alternate ones of these finger patterns are alternatively given an acceleration or retardation potential by means of control flip-flops 54*a* and 54*b*.**

Referring now to FIGS. 5*a*–5*c*, the operation of the filter dynodes 26 to eliminate extraneous signals is illustrated. It is to be noted that the mechanization of the filter unit requires the utilization of Gray coding in the dynode members 20–25. FIG. 5*a* illustrates the retardation factor for each "channel" of the scanner with the addressing logic being actuated to pass a single beam 60 through to the target as illustrated in FIG. 3, but without the use of filter dynode 26. The numeral in each of the squares which schematically represent the various scanner channels indicates the retardation factor for each of such channels under the aforementioned circumstances. Thus, as can be seen, the third channel down, which is the one through which beam 60 (FIG. 3) passes, has a zero retardation factor while the channel directly above this channel has a retardation factor of 1, in view of the fact that there is only a single retardation dynode portion **23*a* in its path without the use of filter dynode 26.** An inspection of FIG. 5*a* will indicate that all of the odd retardation factors occur in diagonal lines on the square pattern. The addition of the checkerboard filter produces the retardation factors indicated in FIG. 5*b* by virtue of the addition of a retardation element for every other channel in the square pattern. Thus, as can be seen, the retardation factor of the second channel down from the upper left corner increases from 1 to 2, the fourth one down from 1 to 2, the sixth one down from 1 to 2, the eighth one down from 3 to 4, etc. It thus can be seen that in this fashion all of the channels having only a single retardation factor are increased in retardation factor to 2. Such increase in retardation to a factor of at least 2. for each channel is always attained, regardless of the particular channel which is being activated, the addressing logic operating to provide an accelerating potential on the checkerboard square corresponding to the activated channel and the associated alternate squares in the checkerboard pattern.

Referring now to FIG. 5*c*, the retardation achieved by means of the filter dynodes illustrated in FIG. 3*a* for the particular channel activation of FIG. 3 is shown. Here it can be seen that while the retardation pattern is somewhat different, again all of the single retardation factor channels are increased to a factor of 2. It is to be noted that the filter dynode arrangement of FIG. 3*a* provides additional retardation in a number of channels over that provided by the checkerboard filter. It thus can be seen that by virtue of the filter dynode device of this invention which operates in conjunction with Gray coding, extraneous actuation signals are elminated in a simple yet highly effective manner.

Referring now to FIGS. 2 and 4, the structural features of one embodiment of the device of the invention are shown. The entire unit is housed in a vacuum tight housing formed by plates 11 and 12 and frame 14. Cathode 16 may be fabricated of electrically conductive material that has been sufficiently radio activated to cause electron emission therefrom at ambient temperatures. If so desired, other types of cathodes such as those of the thermonic or photo-emissive type may also be utilized. Control grid 19 and dynodes 20–26 each comprises a plate 65 of a nonconductive material, such as glass, having thin metallic coatings **19*a*–26*a* and 20*b*–26*b* respectively on opposite sides thereof. Such metallic coatings are arranged in accordance with patterns such as indicated in FIG. 3 to provide a desired coding. It should be noted, of course, as shown in FIG. 3, that the control grid 19** has allover metallic coatings on both sides thereof and hence can be used for intensity modulation of the beam.

Target 15 is formed by a phosphorescent coating on the inner surface of plate 11. It is to be noted, of course, that any suitable insulating material may be utilized in lieu of glass for plates 65. The cathode, the control grid and the various dynodes are separated from each other by means of insulator strips 70, the strips and the various units being joined together to form an integral unit by any suitable means such as cementing. Apertures 47 which are formed in plate members 65 are angulated with respect to the horizontal to form a zigzag pattern. It has been found that the use of such a zigzag pattern enhances the electron multiplication by providing a greater incidence of electrons against the sides of the channels. The sides of apertures 47 are coated with a coating 75 of a material such as lead oxide or tin oxide, which will provide good secondary electron emission with the impingement of electrons thereon. In an operative embodiment of the device of the invention, it has been found that good rseults can be achieved with apertures having a length which is five times their width.

Referring now to FIG. 6, an embodiment of a scanning control that may be utilized in the device of the invention is shown. For the convenience of illustration, only three of the flip-flops and one of the dynodes are shown, this in view of the fact that all of the other flip-flops and dynodes are operated in the same fashion.

Flip-flops 48, 49 and 54 are energized by means of power sources 90, 91 and 92 respectively. Each such power source, however, is referenced at a different potential point along voltage divider 35 which receives the potential of power source 33 thereacross. Flip-flops 48, 49 and 54 are actuated in response to the output of addressing logic 40, which in turn is controlled by control signal source 41. At any one time either one or the other of the flip-flop stages of each of flip-flops 48, 49 and 54 is conductive, while the other is at cutoff.

The collector of flip-flop stage **48*a* is connected to the top section of conductive portion 20*a*, and the bottom section of conductive portion 20*b*, while the collector of flip-flop stage 48*b* is connected to the top section of conductive portion 20*a*. Thus, for example, when flip-flop stage 48*a* is conductive and stage 48*b* non-conductive, the top section of conductive portion 20*a* will have a positive potential with respect to the bottom section thereof, while the bottom section of conductive portion 20*b* will have a positive potential with respect to the top section thereof. When the flip-flop reverses such that section 48*b* becomes conductive and section 48*a* becomes non-conductive, an opposite polarity condition will be presented to the dynode portions. The potential of power sources 90–92 is made sufficent to produce an adequate repelling signal to the electron beam, (e.g. of the order of 200 volts). While a single high voltage repelling signal can be used for all the dynodes, the use of separate incremental potential gradients, as shown and described in connection with FIG. 6, greatly alleviates dynode insulation problems. In this fashion the flip-flops are utilized at the various dynodes to control the electron beam. As already noted, each of the flip-flops is used in the same fashion as described for flip-flop 48 and dynode 20** for the control of their respective dynodes.

Thus, with a relatively small number of flip-flops, complete random addressing control can be achieved in the device of the invention. Of course, as the number of dynode stages is increased, the size of the individual apertures can be decreased and thus the definition of the device improved. While the intensity of the electron beam would normally tend to decrease with the number of dynodes, this problem is obviated by virtue of the electron multiplication achieved in the device of the invention which proportionately compensates for the diminution of the electron beam intensity as the number of control apertures and dynodes are increased. It is to be noted that very good focusing and linearity is achieved in the device of the invention by virtue of the utilization of alined apertures in controlling the electron beam. Thus, such beam is tightly controlled through its entire path, and is not subject to ambient disturbances.

The device of this invention thus provides simple yet highly effective means for eliminating "ghost" signals in an electron beam scanner of the type described.

While the device of the invention has been described and illustrated in detail, it is to be clearly understood that this is intended by way of illustration and example only and is not to be taken by way of limitation, the spirit and scope of this invention being limited only by the terms of the following claims.

We claim:

1. In an electron beam scanning device, a target member, an electron source, a power source connected between the target member and the electron source for providing an electron accelerating potential therebetween, a plurality of dynode members sandwiched between the electron source and the target member for controlling the flow of electrons therebetween, the dynode members each having first and second groups of conductive finger portions which are insulated from each other and a plurality of aperture means therein forming channels for the flow of electrons between the electron source and the target member, said finger portions being arranged in a pattern according to Gray code, control means for selectively applying an electron accelerating potential to one of the finger portion groups of each dynode member and an electron retarding potential to the other of the finger portion groups of each pair thereof to selectively activate one of said channels at a time, the improvement comprising filter dynode means interposed between said electron source and said target for increasing the retardation factor of the non-activated channels of said scanner, said filter dynode means having first and second groups of conductive portions, said first group of filter dynode means conductive portions being arranged in alternate fashion with said second group of filter dynode means conductive portions, each of said conductive portions corresponding to at least one of the channels of said scanning device, and control means for alternatively applying an electron accelerating potential to one of said groups of conductive portions of said filter dynode means and an electron retarding potential to the other of said groups of conductive portions of said filter dynode means to place a retarding potential in at least every alternate one of said channels with a non-retarding potential being placed in the activated channel.

2. The device as recited in claim 1 wherein said filter dynode means conductive portions are arranged in a checkerboard pattern, each of said conductive portions forming a square of said checkerboard, alternate checkerboard squares comprising the conductive portions groups of said filter dynode means.

3. The device as recited in claim 1 wherein said filter dynode means comprises a pair of dynode filter elements, the conductive portions of one of said filter elements being oriented perpendicularly to the conductive portions of the other of said filter elements.

4. In an electron beam scanning device a target member, an electron source, a plurality of dynode members sandwiched between said electron source and said target member for controlling the electron flow therebetween, said target member, said electron source and said dynode members being in the form of thin flat plates, said dynode members having apertures therein, the apertures on successive dynode members being alined to form electron channels, the apertured portions of each of said dynode members being surrounded by conductive finger portions, said finger portions being arranged in first and second separate groups in a predetermined coded pattern, control means for alternatively applying an electron accelerating potential to one of said finger portion groups and an electron retarding potential to the other of the finger portion groups to selectively activate one of said channels at a time, the improvement comprising filter dynode means interposed between said electron source and said target for increasing the retardation factor of the non-activated channels of said scanner, said filter dynode means comprising a flat plate having apertures formed therein corresponding to the electron channels, a first group of conductive portions surrounding half of said filter dynode apertures, a second group of conductive portions arranged alternately with said first group surrounding the other half of said filter dynode apertures, and control means for alternatively applying an electron retarding potential to one or the other of said groups of filter dynode means conductive portions, to place an electron retarding potential in at least every alternate one of said channels and a non-retarding potentil in the activated channel.

5. The electron beam scanning device of claim 4 wherein said filter dynode means conductive portions are arranged in a checkerboard pattern with each of said conductive portions forming a square of said checkerboard.

References Cited

UNITED STATES PATENTS

| | | | |
|---|---|---|---|
| 3,408,532 | 10/1968 | Hultberg et al. | 315—12 |
| 3,421,042 | 1/1969 | Hultberg | 315—12 |

ROBERT L. GRIFFIN, Examiner

A. H. EDDLEMAN, Assistant Examiner

U.S. Cl. X.R.

315—12